INVENTOR
RICHMOND T. BELL
ATTORNEY

INVENTOR.
RICHMOND T. BELL
BY
Edward W. Fang
ATTORNEY

United States Patent Office 2,808,441
Patented Oct. 1, 1957

2,808,441

FRACTIONAL CONDENSATION METHOD OF METHANETHIOL RECOVERY FROM REACTION MIXTURES THEREOF

Richmond T. Bell, Grayslake, Ill., assignor to The Pure Oil Company, Chicago, Ill., a corporation of Ohio Continuation of abandoned application Serial No. 260,353, December 7, 1951. This application May 20, 1954, Serial No. 431,230

6 Claims. (Cl. 260—609)

This invention relates to the production of methanethiol from methanol and hydrogen sulfide by means of an efficient, catalytic, continuous process, preferably operated under superatmospheric pressure. It is specifically concerned with a continuous process for preparing methanethiol by reacting methanol and hydrogen sulfide in the presence of a metallic oxide catalyst and processing the reaction effluent in a product recovery section to recover methanethiol and 2-thiapropane. This application is a continuation of U. S. patent application Serial No. 260,353, filed December 7, 1951, now abandoned.

Although the batchwise preparation of methanethiol by reacting methanol and hydrogen sulfide in the presence of a suitable metallic oxide catalyst is well-known, heretofore no commercial process for continuously manufacturing methanethiol has been available. Previous efforts which were carried out incidental to other work were crudely executed and results therefrom were inconclusive and misleading. The processing methods employed were so inadequate that the production of substantial quantities of 2-thiapropane was not even discovered, much less recovered, and as nearly as can be determined material balances were only about 50%. The importance of methanethiol and 2-thiapropane as articles of commerce as organic intermediates, particularly for the production of methionine, sulfonium compounds, and methyl sulfonates and sulfates, as well as other uses, has made the availability of a commercial process for manufacturing these compositions desirable.

Accordingly, it is an object of this invention to provide a practical and efficient continuous process for manufacturing methanethiol, recovering and separating 2-thiapropane, and recovering unconverted methanol, and if desired, hydrogen sulfide.

It is a further object to provide a process for manufacturing methanethiol and 2-thiapropane which is operated under pressures sufficient to permit effluent condensations, separations, and recoveries to be made without resorting to coolant temperatures lower than those ordinarily available in waters for industrial use.

Figure 1:
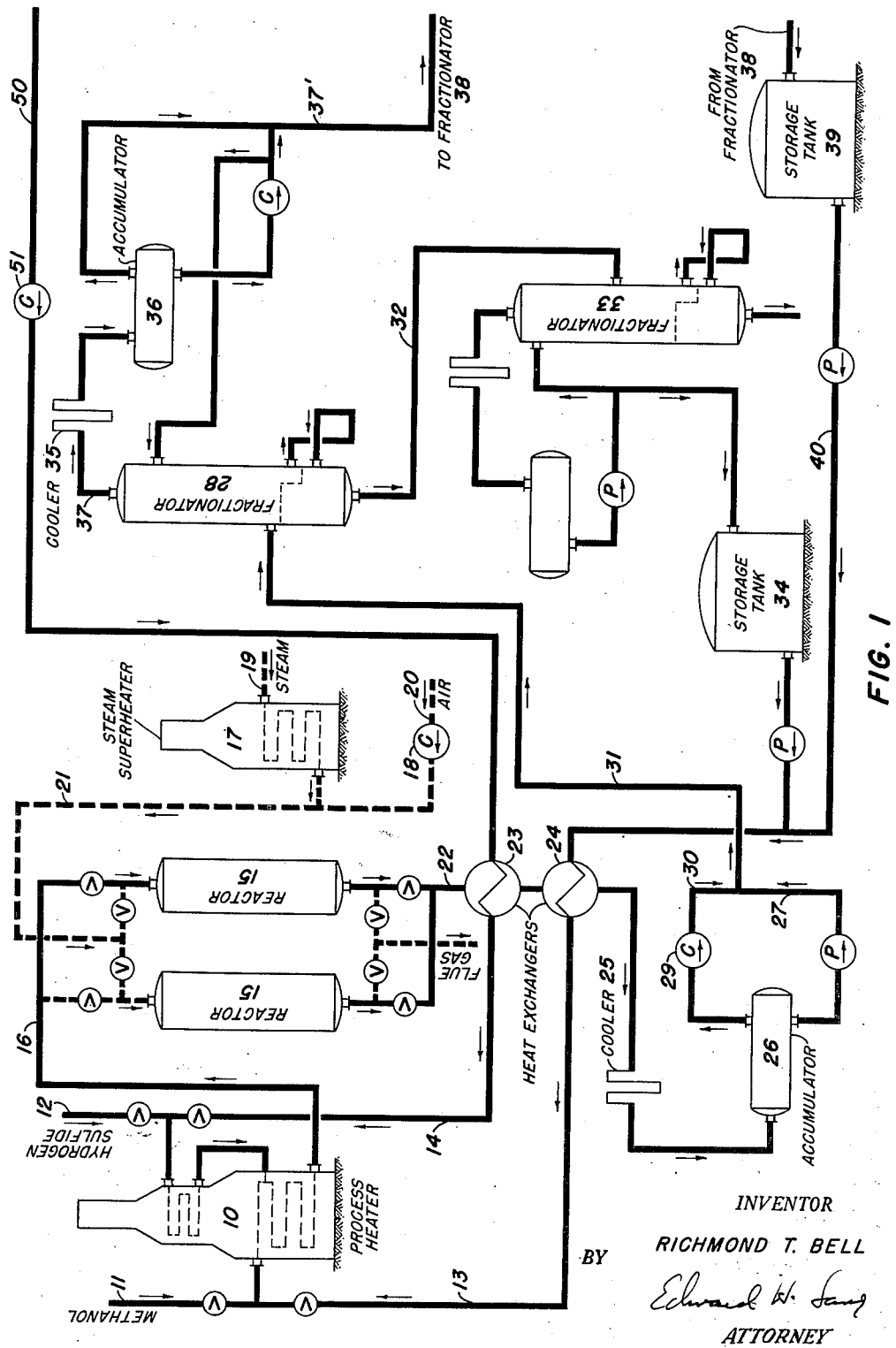
Figure 2:
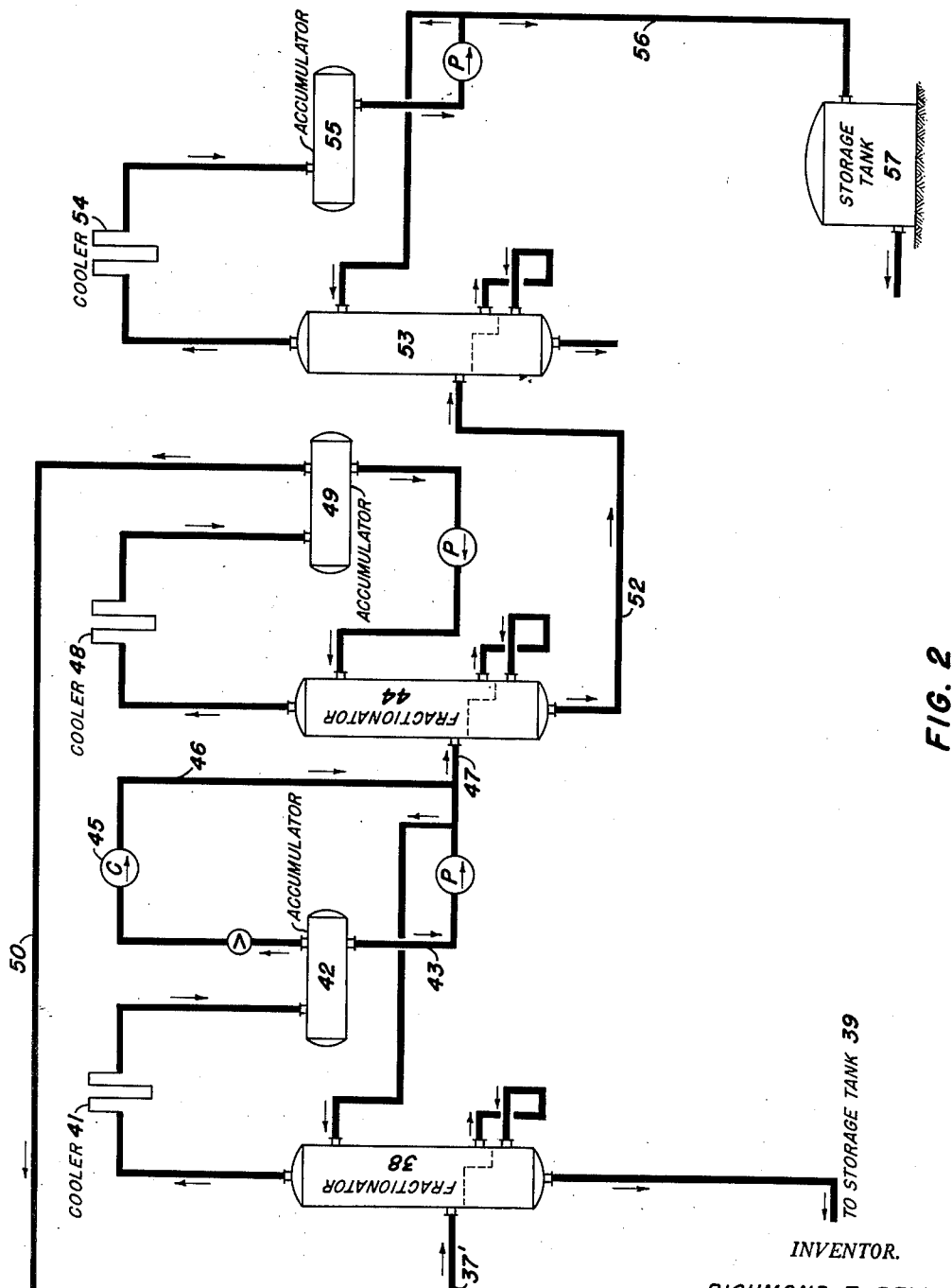

A schematic diagram of a continuous process for producing methanethiol is shown in Figures 1 and 2. Modifications of the recovery section of this process are illustrated diagrammatically by Figures 3 and 4.

The preparation of mercaptans or organic thiols may-be carried out by various methods. Perhaps the most simple is the direct method of passing the vapors of an alcohol admixed with hydrogen sulfide over suitable metallic oxide catalysts such as thoria at elevated temperatures. In this method there is induced a metathetical interchange of the hydroxy group of the alcohol with the sulfhydryl group of the hydrogen sulfide in accordance with the following reaction:

$$ROH + H_2S \rightarrow RSH + H_2O$$

The efforts of the prior art workers to produce mercaptans by this method have been confined to improvements in the preparation or reaction phase of the process. The problems involved in the continuity of processing and product recovery aspects of mercaptan preparation were unrecognized because the small volume and type of product obtained in the laboratory experiments described in support of their methods did not make them cognizant of the problems that existed, particularly in connection with the preparation of low molecular weight mercaptans and alkyl sulfides such as methanethiol and 2-thiapropane. These compounds are obviously more volatile than the higher molecular weight products and present product recovery difficulties, not extant in handling the higher molecular weight products, which must be overcome in providing an efficient, continuous process for the production of methanethiol and 2-thiapropane. It has been found that these processing difficulties can be overcome by employing the manipulative process described by this invention.

When methanol and hydrogen sulfide are reacted to form methanethiol there is produced a reaction effluent consisting essentially of methanethiol, 2-thiapropane, water, and unconverted methanol and hydrogen sulfide.

Referring to the accompanying drawing, it is seen that the preferred general basis for the recovery and separation of the products and unconverted reactants issuing from the reactor is fractional condensation and stabilization. This sequential operation is shown in Figures 1 and 2. In carrying out this process the charge to the process heater 10 is comprised of recycle materials together with such fresh methanol and hydrogen sulfide as may be necessary. The fresh methanol is charged by means of line 11 and fresh hydrogen sulfide is charged through line 12, connected to suitable sources of supply. For example, the hydrogen sulfide may be obtained as a by-product from petroleum refining operations, carbon disulfide production which employs hydrocarbon gases and elemental sulfur as reactants, or from any other available means. The recycled reactants obtained, as hereinafter described, from the product recovery section of the process may be reintroduced into the process heater 10, by means of lines 13 and 14, if desired. The hydrogen sulfide is heated separately from the methanol in one section of the heater, and enters the stream of methanol, early in its heating, being vaporized and heated in the other section of the heater. In this way, thorough mixing and uniform heating of the reaction mixture is secured. The temperature at which the gaseous reaction mixture from the process heater enters the reaction chamber depends on the conditions of space velocity, catalyst activity, pressure, reactant ratio, temperature, etc., under which the reaction is to be carried out. Under ordinary conditions, it is usually somewhat lower than the catalyst temperature desired, within about 20° F. of said temperature. The pre-heated reactants are passed to the reactors 15 by means of line 16.

Alternate catalyst chambers 15 permit uninterrupted operation. When the activity of the catalyst in the on-stream reactor declines, the reactants can be turned into the other chamber containing regenerated or fresh catalyst by means of a suitable valve manifold system while a mixture of super-heated steam and air is admitted to the spent catalyst to burn off carbonaceous and sulfurous deposits and regenerate its activity. This gaseous regeneration mixture is supplied by an auxiliary system consisting of a steam superheater 17 and compressor 18. Steam from a suitable source is introduced into the superheater 17 by means of line 19. Air is supplied by line 20 to compressor 18. The superheated steam and compressed air are admixed and supplied to the regeneration system through line 21. In the instance where a supported thoria catalyst is employed, the composition of the air-steam mixture, its rate of flow, and its temperature should be such that the temperature of the catalyst during regeneration does not exceed a maximum of 850° F. Exposing the catalyst to higher temperatures risks permanent, substantial impairment of its activity. The lowest temperature at which the regeneration can be carried out satisfactorily is the most desirable operating temperature. While Figure 1 shows the use of a fixed bed type of operation, the reaction phase of the process may also be alternatively carried out in the moving bed type operation employing either a granular or bead form of catalyst or in a fluid type operation employing a finely comminuted catalyst.

By means of the apparatus shown in the Figure 1, steam can be introduced to provide a small proportion of water vapor in the reaction mixture in accordance with copending application Serial Number 342,710, filed March 16, 1953, Now U. S. Patent 2,685,605. Alternatively, the small ratios of water found to be desirable for optimum yields can be introduced by operating the recovery system so as to leave a desired, small quantity of water in the recycle methanol. As another means whereby water may be introduced into the reaction zone water can be added directly to the fresh methanol charged.

Thorium oxide, supported or unsupported, is one of the suitable catalysts for the reaction, but other metallic oxide catalysts which are effective are the oxides of zirconium, titanium, uranium, tungsten, molybdenum, chromium, vanadium, manganese, zinc, cadmium, and aluminum. Although all the oxides of these metals are effective for the purposes of this invention, in cases where several oxides of a given metal exist, intermediate oxides between the lowest and highest oxide, whether well-defined oxides, consistent molar compounds, or mixtures of higher and lower oxides are preferred.

While the metallic oxides may be used per se, it is usually preferable to support them on a carrier such as activated alumina, bauxite, silica gel, pumice, carbon, or montmorillonite type clays. Activated alumina, silica and carbon are preferred for supports, especially the alumina since it has a minor degree of catalytic activity itself under the ordinary range of reaction conditions. Thoria is preferred for the more active component of the catalyst, but when indicated by better availability or economics oxides of the other metals listed may be substituted. Zirconia and titania are other oxides which are also favored.

The activity of a supported thoria catalyst is dependent upon the method and care used in its preparation, particularly with respect to the temperatures and heating schedules employed. Very effective catalysts with pumice/thoria mol ratios between 10/1 and 30/1 may be prepared from thorium nitrate and pumice purified by extraction with hydrochloric acid until free of iron oxides and other metallic oxides and compounds extractable with hydrochloric acid. For example, a 25% by weight solution of 115 parts of thorium nitrate tetrahydrate in 345 parts of methanol was poured into 169 parts of purified pumice, and the mixture was continuously stirred at 120° to 140° F. until the methanol was evaporated. Further drying was carried out at a constant temperature of 230° F. over a period of 15 hours.

The pumice impregnated with thorium nitrate was then decomposed in a special reactor tube. Measurements of temperature were made regularly at various points in the bed. Smooth and uniform heating was provided. The catalyst was slowly brought to 525° F. over a period of 6 hours, with a current of dry air passing through, after which time exit gases were only slightly acid as determined by moist litmus. Thereafter the temperature was raised to 750° F. as rapidly as possible without causing local overheating or excessive temperature gradients, and was maintained at 750° F. until exit gases were completely free of acidic constituents. After removal from the reactor, the catalyst was screened to separate any "fines."

As another example, the same quantities of materials were employed but with water as a solvent for the thorium nitrate tetrahydrate instead of methanol. Also, a somewhat finer average mesh pumice was used, viz., that retained on 16 mesh screen. In general, the "fines" from a thoria-pumice catalyst prepared in this way were between 1 and 2% by weight of the combined weight of the thoria, as calculated from the initial weight of thorium nitrate, and the initial weight of purified pumice. The thoria in the "fines" can be easily reclaimed as nitrate. Taking handling losses into account, and considering "fines" as thoria, the pumice/thoria mol ratio in both finished catalysts was about 13/1. A representative molecular weight of 67.7 for purified pumice was used. Before use, these catalysts were conditioned by pre-treatment with methanol vapor in accordance with U. S. Patent 2,592,646.

The effluent vapor mixture from the catalyst reaction chamber 15, consisting principally of water, methanol, 2-thiapropane, methanethiol and hydrogen sulfide, passes by means of line 22 through heat exchangers 23 and 24 and a cooler 25, whereby a part of the two highest-boiling components, water and methanol, is condensed and collected in accumulator 26. Liquid methanol-water, saturated with the three vapor components under ambient conditions, is pumped through line 27 to the demethanolizer and dehydrator column 28, and crude 2-thiapropane-methanethiol-hydrogen sulfide vapor mixture containing methanol and water vapor is taken from the top of the accumulator 26 by a compressor 29 and passed through line 30 to a confluent point where the streams are admixed and pass into the demethanolizer and dehydrator column 28 through line 31.

The demethanolizer and dehydrator column 28, which is a fractional distillation apparatus, functions as a stabilizer-fractionator to strip methanol and water free of 2-thiapropane-methanethiol-hydrogen sulfide vapor, and to condense all methanol and water from this vapor. The liquid methanol-water is recovered as bottoms from this tower and transferred by line 32 to another fractional distillation tower 33. Therein the methanol-water fraction is separated into a methanol overhead product and a water residue. The methanol thus recovered passes to a storage tank 34 from which it is pumped back to the process heater 10 through exchanger 24 as recycle charge stock. The separated water flows to a waste disposal system. The overhead vapor from column 28 consisting essentially of 2-thiapropane, methanethiol and hydrogen sulfide passes through a cooler 35 to an accumulator 36, whereby a major part of the 2-thiapropane is condensed. The liquid and vapor therefrom are passed through line 37' to column 38. If desired a compressor may also be put in the vapor line from the accumulator 36 following column 28, but is not considered necessary.

Column 38, which in the embodiment of this invention delineated in Figure 2 is a fractional distillation apparatus, functions as a stabilizer-fractionator to strip 2-thiapropane free of methanethiol-hydrogen sulfide vapor, and to condense all 2-thiapropane from said vapor. The liquid 2-thiapropane withdrawn from the bottom of column 38 is conducted to a storage tank 39 as a by-product of the process when the primary purpose of operation is to produce methanethiol. When such purpose is the main objective in operating this process it is often desirable to introduce a small amount of 2-thiapropane with the charge in order to retard thiapropane formation and improve overall operation and efficiency for production of methanethiol. Thus the flow diagram in Figure 2 shows a line 40 connecting the 2-thiapropane draw-off line to the recycle methanol line 13. The overhead vapor from column 38 passes through a cooler 41 to condense most of the methanethiol, and thence to an accumulator 42. Liquid methanethiol from this accumulator 42, saturated with hydrogen sulfide under ambient conditions, is pumped through line 43 to column 44. Hydrogen sulfide containing methanethiol vapor is taken from the top of the accumulator 42 by a compressor 45 and passed through line 46 to join the stream of liquid methanethiol, and the combination then proceeds through line 47 into column 44.

In column 44, which in this embodiment of the invention is another fractional distillation apparatus, methanethiol is stripped free of hydrogen sulfide, and any methanethiol is condensed from the hydrogen sulfide. The hydrogen sulfide passes overhead through a cooler 48 and accumulator 49. If desired the hydrogen sulfide may be recycled by means of line 50 through a compressor 51 and exchanger 23 to the process heater 10 as recycle charge. Liquid methanethiol from the bottom of column 44 passes through line 52 to column 53 for rectification. In column 53 the pure methanethiol is taken overhead through a cooler 54 to an accumulator 55. Liquid methanethiol from the accumulator is pumped through line 56 to storage facility 57.

Figure 3:
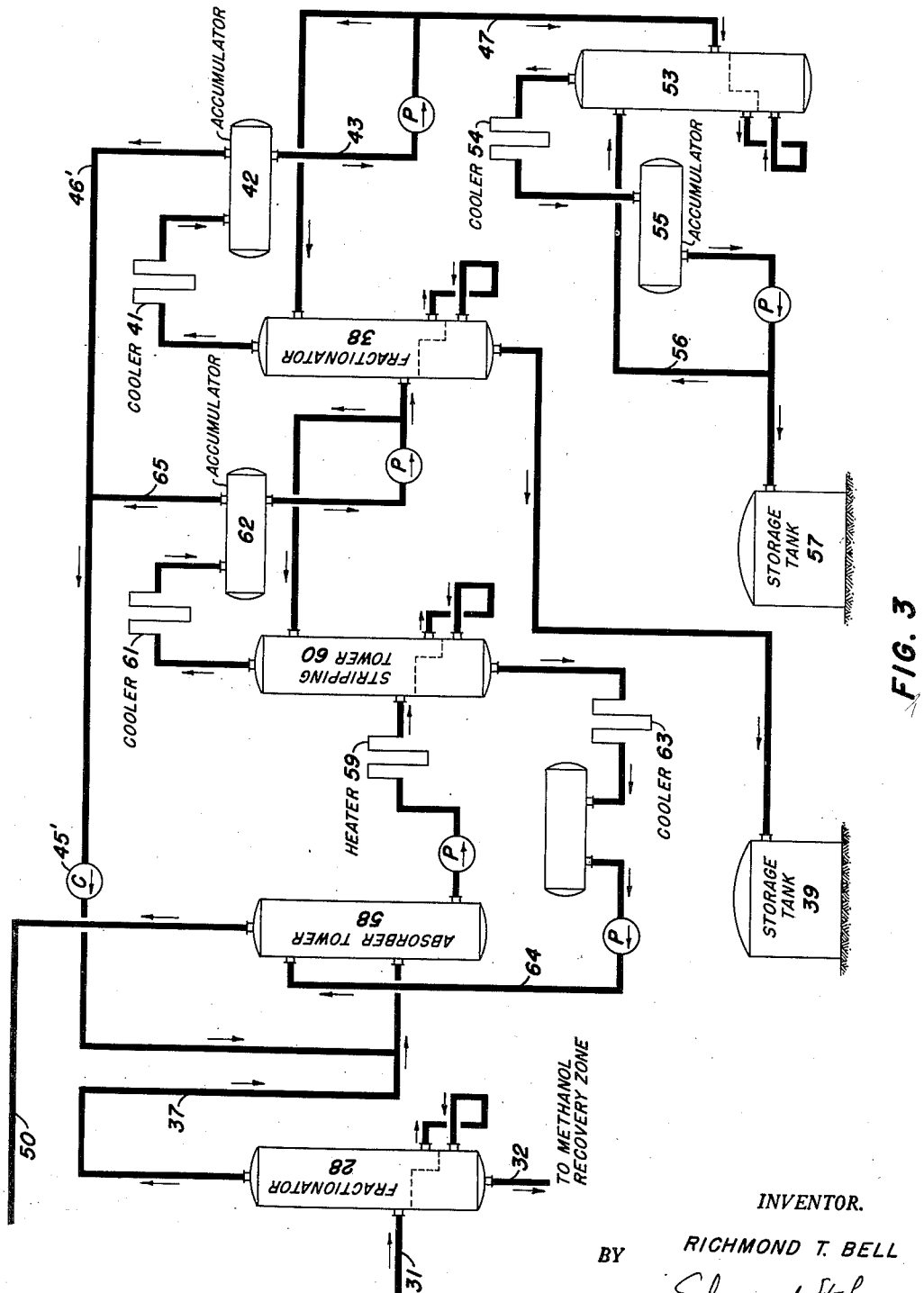

Alternatively, the process can be carried out as shown in Figure 3. In this variation the overhead from column 28 enters an absorption tower 58 wherein the feed is contacted with an absorbent such as white oil or kerosene. In order to assure the absence of unsaturated hydrocarbons and a very low sulfur content, highly refined hydrocarbon products such as these are preferred. However, other petroleum products of similar boiling ranges, such as light lubricating oil base stocks, gas oil, light fuel oils, or heavy naphthas are suitable providing the contents of unsaturates and sulfur are low. The methanethiol and 2-thiapropane are absorbed, and the unabsorbed hydrogen sulfide passes overhead as residue off gas and may be returned through line 50 to the process heater 10 as recycle charge, if desired. The fat absorbent rich with methanethiol and 2-thiapropane is pumped from the bottom of the absorber 58 through a heater 59 to a stripping tower 60 where the rich absorbent is denuded of mathanethiol and 2-thiapropane which pass overhead through a cooler 61 to an accumulator 62. The lean absorbent is pumped from the stripper 60 through cooler 64 where it is again contacted with a feed consisting of the overhead from column 28. Hydrogen sulfide, saturated with methanethiol and 2-thiapropane under ambient conditions within the accumulator 62, is led from the top of the stripper accumulator 62 by means of line 65 back to join the stream of overhead entering the absorber from column 28. The liquid mixture of methanethiol and 2-thiapropane is pumped from the bottom of the accumulator 62 to column 38, functioning principally as a fractionator, where 2-thiapropane is drawn from the bottom to storage and methanethiol passes overhead through a cooler 41 to accumulator 42. However, in this variation of the process line 46' from the top of accumulator 42 runs back to join line 65 leading from the top of the stripper accumulator, instead of being transferred to column 44 as shown in Figure 2. The compressor 45' is then located between the point where the two accumulator vapor lines 46' and 65 join and the point where this common line meets line 37 carrying overhead from column 28 to the absorber 58. In this variation of the process column 44 is eliminated and liquid methanethiol is pumped from the bottom of accumulator 42 to column 53 where it is purified and thereafter passed to storage. Also the absorber is preferably operated at pressures between 30 and 90 pounds per square inch absolute and the stripper at pressures about 5 to 10 per square inch less than that in the absorber.

Figure 4:
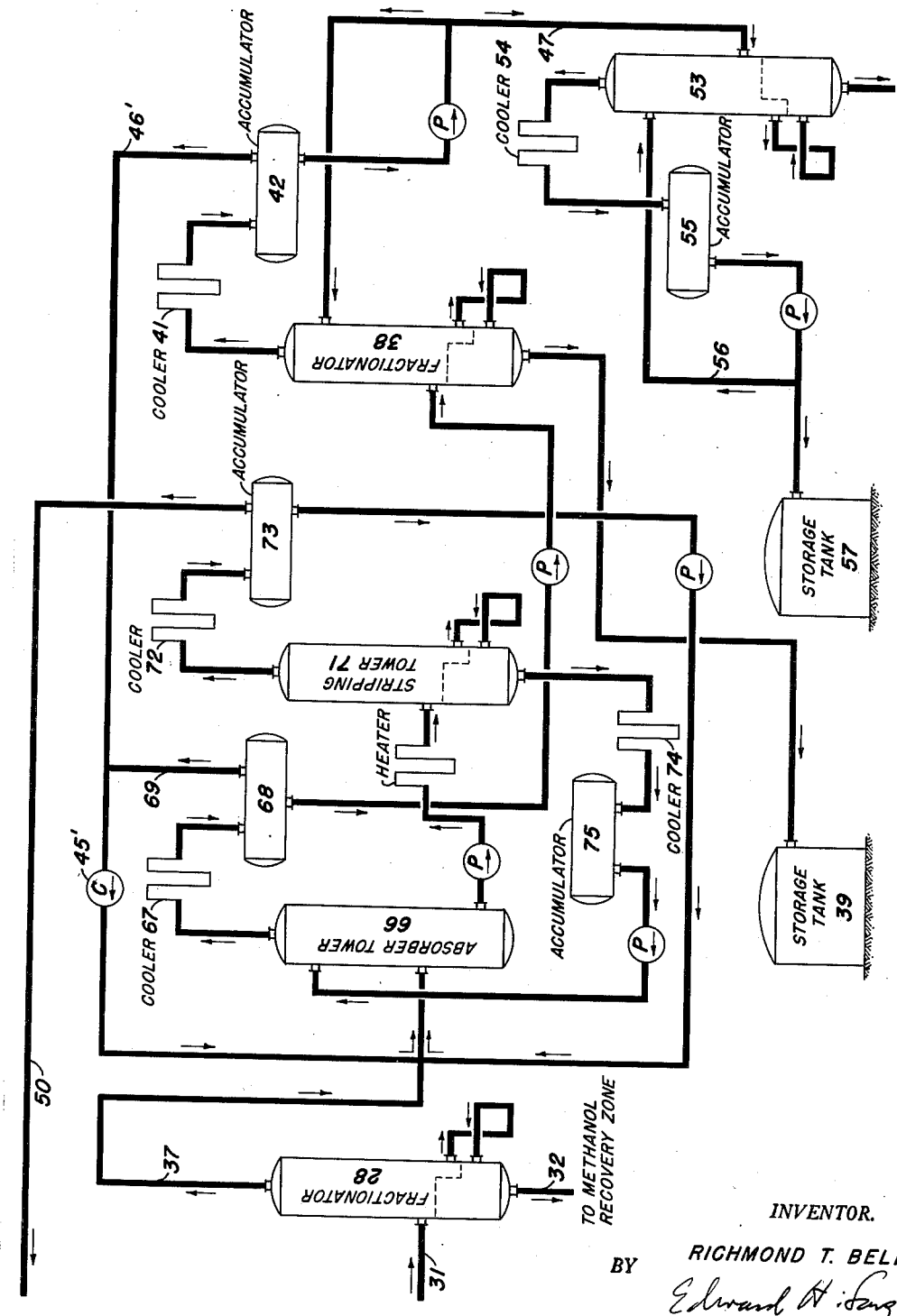

As a further embodiment of this invention the process can be carried out as shown by Figure 4. In this embodiment the overhead from column 28 enters an absorption tower 66 wherein the feed is contacted with an absorbing medium. Suitable absorbents include aqueous and glycol solutions of alkylol amines such as mono-, di-, and tri-ethanolamine, alkacid solutions such as those of sodium alanine, potassium diethyl glycine, and sodium phenolate, and solutions of alkali metal salts such as those of tri-potassium phosphate, potassium carbonate, and sodium carbonate. Aqueous solutions of mono- or di-ethanolamine are preferred absorption media. The hydrogen sulfide is absorbed and thiol-thiapropane passes overhead through a cooler 67 to an accumulator 68. A vapor line 69 from the top of this accumulator runs back to join line 37 entering the absorber 66 from column 28. Liquid thiol-thiapropane is pumped from the bottom of the absorber accumulator 68 to column 38. Thereafter the thiol-thiapropane mixture is process in accordance with the variation described above and diagrammatically in Figure 3.

Absorbent rich with hydrogen sulfide is pumped from the bottom of the absorber 66 through a heater to the stripper, passes through a cooler 72 and an accumulator 73, and may be returned via line 50 to the process heater 10 as a recycle charge, if desired. Any liquid condensate in the stripper accumulator 73 is pumped from the bottom of the accumulator 73 back to the line 37 carrying overhead from column 28 to the absorber 66. Lean absorbent from the bottom of the stripper 71 passes through a cooler 74 to an accumulator 75 from whence it is recycled to the top of the absorption tower 66.

In general, operation according to the combination of steps represented by Figure 1, under pressures sufficiently high to permit use of coolants at temperatures commonly available, is preferred. Also, with either of the embodiments represened by Figures 2 and 3 operation under said pressures is preferred. In the modification represented by Figure 4, operation of the absorber and stripper under the lowest pressures practical in relation to the rest of the recovery system is preferred. When ordinarily available coolants such as industrial water having a temperature between 60° and 100° F. are used, notable economies and more efficient operation is possible. The use of superatmospheric operating pressures permits the use of such coolants.

However, still more flexbility for adaptation to local conditions or changing economics is achieved by additional alternatives. The variations represented by Figures 1, 2, 3 and 4 may be conducted under substantially atmospheric pressure. If this procedure is employed refrigeration of the coolants is required; or, the reaction section up to the cooler preceding the initial rceeiver may be operated at substantially atmospheric pressure with the recovery and separation section including and following said cooler maintained under the aforementioned superatmospheric pressures.

Under usual ranges of conditions, conversions, and coolant temperatures, pressures ranging up to about 600 pounds per square inch absolute suffice, and pressures in excess of about 1000 pounds per square inch absolute seldom will be required. This invention is not so limited, however, and if the process is so conducted that stabilizer reboiler temperatures and/or stabilizer partial condenser temperatures are unusually high, pressures up to about 1500 pounds per square inch absolute can be imposed as required.

A specific example of the process conducted according to the combination of steps represented in Figures 1 and 2 is as follows: With a reactor (catalyst center) temperature of 788° F., a space velocity of 657, a hydrogen sulfide to methanol mol ratio of 1.004 to 1, a methanol to water mol ratio of 100 to 1, atmospheric pressure, and a pumice-supported thoria catalyst, a total methanol conversion amounting to 54.5 of the maximum possible is achieved. Methanol conversion to methanethiol is 46.7% of the maximum possible and conversion to 2-thiapropane is 7.8%, an excellent conversion ratio (percent to $CH_3SH$/percent to $(CH_3)_2S$) of about 6. The yield of methanethiol per pass per 100 pounds of methanol charge is 70.1 pounds and the yield of 2-thiapropane is 7.6 pounds. The material balance is 99.8% by weight.

When the reactor effluent is cooled by the heat exchangers, cooler, and accumulator to about 275° F., and the kettle temperature of column 28 is maintained at about 275° F., the pressure required for operation of the column to produce liquid bottoms consisting essentially of only methanol and water is approximately 85 to 90 pounds per square inch absolute. The mol fraction of methanol in the bottoms is about 0.43 and that of water 0.57.

The methanol and water bottoms from column 28 are transferred to column 33 where, with the kettle temperature at about 275° F., a pressure of about 45 to 50 pounds per square inch absolute is required for operation to produce water bottoms with a minimum content of methanol. With the temperature of the methanol vapor in the condenser for column 33 at about 200° F., the pressure required on the condenser is about 40 to 45 pounds per square inch absolute. However, column 33 and its condenser may be operated at subtsantially atmospheric pressure when the kettle temperature is about 210° F., and that of the vapor distillate in the condenser is 150° F.

With the vapor distillate from column 28 (approximate mol fraction composition: hydrogen sulfide=0.510, methanethiol=0.452, 2-thiapropane=0.038) at a temperature of about 80° F. in the condenser, the pressure required on the condenser is about 85 to 90 pounds per square inch absolute. The approximate mol fraction composition of the reflux is: hydrogen sulfide= 0.217, methanethiol=0.620, and 2-thiapropane=0.162.

Proceeding to column 38, with the kettle temperature at about 215° F., a pressure of about 85 to 90 pounds per square inch absolute is required for operation to produce the desired bottoms, essentially only 2-thiapropane.

With the vapor distillate from column 38 (mol fractions: hydrogen sulfide=0.53, methanethiol=0.47) at a temperature of about 70° F. in the condenser, the pressure required on the condenser is about 85 to 90 pounds per square inch absolute, and the approximate mol fraction reflux composition is hydrogen sulfide=0.25, methanethiol=0.75.

In column 44, for operation to produce bottoms consisting substantially of methanethiol only, a pressure of about 270 to 275 pounds per square inch absolute is required with the kettle temperature at about 235° F.

With the hydrogen sulfide vapor distillate from column 44 at a temperature of about 70° F. in the condenser, the pressure on the condenser is about 265 to 270 pounds per square inch absolute.

High purity methanethiol is produced by rectification of the bottoms from column 44 in column 53 where, in order to produce pure methanethiol vapor distillate and bottoms comprising only higher boiling impurities, a pressure of about 35 to 40 pounds per square inch absolute is required with the kettle temperature approximately 150° F.

With the methanethiol vapor distillate at a temperature of about 70° F. in the condenser, the pressure on the condenser is about 25 to 30 pounds per square inch absolute.

At atmospheric pressure, refrigeration of the coolants used in the recovery and separation section is required, but when superatmospheric pressures are employed such refrigeration is not necessary. Under the same conditions, except for pressure, as given in the foregoing illustrative example, the reactor is operated under a pressure of about 300 pounds per square inch absolute. The hydrogen sulfide taken from column 44 accumulator at a pressure of about 265 to 270 pounds per square inch absolute is recycled to the reactor through a compressor to increase the pressure back to 300 pounds per square inch absolute. Thus by the use of suitable superatmospheric pressures, refrigeration of coolants is eliminated or substantially reduced, separations are more precise and efficient, and the ratio of yields to equipment size is substantially increased, these advantages being obtained without decrease in methanethiol conversion or substantial change in the ratio of methanethiol conversion: 2-thiapropane conversion.

The foregoing specific examples of the instant invention are intended to be only illustrative. Other manipulative techniques embodying this invention will be obvious to those skilled in the art. Such equivalent systems are within the scope of this invention.

What is claimed is:

1. In a continuous process for the production of methanethiol wherein methanol and hydrogen sulfide are reacted at an elevated temperature in a reaction zone in the presence of a catalyst capable of splitting off water to produce a reaction effluent consisting essentially of water, methanol, 2-thiapropane, methanethiol, and hydrogen sulfide, the improvement which comprises fractionally condensing said effluent in a product recovery process maintained at a suitable superatmospheric pressure not in excess of about 1500 p. s. i. a. to obviate the need for mechanical refrigeration in said recovery process and permit the use of cooling water at a temperature of about 60°–100° F. for cooling and fractionally condensing the several constituents of the reaction effluent, said process comprising introducing said effluent into a first fractional condensation zone, fractionally condensing said effluent at a suitable elevated pressure with cooling water at a temperature of about 60°–100° F. to produce a first liquid phase consisting essentially of water and methanol, and a first gaseous phase consisting essentially of 2-thiapropane, methanethiol and hydrogen sulfide and stabilizing said liquid and gaseous phases to produce a first, liquid, bottoms fraction consisting essentially of water and methanol, and a first, gaseous, overhead fraction consisting essentially of 2-thiapropane, methanethiol, and hydrogen sulfide; introducing said first overhead fraction into a second fractional condensation zone, fractionally condensing said fraction at a suitable elevated pressure with cooling water at a temperature of about 60°–100° F. to produce a second liquid phase consisting essentially of 2-thiapropane and a second gaseous phase consisting essentially of methanethiol, and hydrogen sulfide and stabilizing said liquid and gaseous phases to produce a second, liquid, bottoms fraction consisting essentially of 2-thiapropane and a second, gaseous overhead fraction consisting essentially of methanethiol and hydrogen sulfide; and introducing said second overhead fraction into a third fractional condensation zone, fractionally condensing said fraction at a suitable elevated pressure with cooling water at a temperature of 60°–100° F. to produce a third liquid phase consisting essentially of methanethiol, and a third gaseous phase consisting essentially of hydrogen sulfide and stabilizing said phases to produce a third, liquid, bottom fraction consisting essentially of methanethiol, and third overhead product consisting essentially of hydrogen sulfide.

2. In a process in accordance with claim 1 the steps of fractionally distilling said first, liquid, bottoms fraction consisting essentially of methanol and water, recovering the methanol and recycling said methanol to said reaction zone.

3. In a continuous process for the production of methanethiol wherein methanol and hydrogen sulfide are reacted at an elevated temperature in a reaction zone in the presence of a catalyst capable of splitting off water to produce a reaction effluent consisting essentially of water, methanol, 2-thiapropane, methanethiol, and hydrogen sulfide, the improvement which comprises fractionally condensing said effluent in a product recovery process maintained at a suitable superatmospheric pressure not in excess of about 600–1000 p. s. i. a. to obviate the need for mechanical refrigeration in said recovery process and permit the use of cooling water at a temperature of about 60°–100° F. for cooling and fractionally condensing the several constituents of the reaction effluent, said process comprising cooling said reaction effluent at a suitable elevated pressure with cooling water at a temperature of 60°–100° F., to produce a first liquid phase consisting essentially of water and methanol, and a first gaseous phase consisting essentially of 2-thiapropane, methanethiol and hydrogen sulfide, admixing said liquid phase and said gas phase to produce a first, gas-liquid admixture, stabilizing and fractionating said admixture to produce a first, liquid, bottoms fraction consisting essentially of water and methanol, and a first, gaseous, overhead fraction consisting essentially of 2-thiapropane, methanethiol, and hydrogen sulfide; cooling said first overhead fraction at a suitable elevated pressure with cooling water at a temperature of about 60°–100° F. to produce a second liquid phase consisting essentially of 2-thiapropane and a second gaseous phase consisting essentially of methanethiol, and hydrogen sulfide, admixing said liquid phase and said gas phase to produce a second, gas-liquid admixture, stabilizing and fractionating said admixture to produce a second, liquid, bottoms fraction consisting essentially of 2-thiapropane and a second, gaseous overhead fraction consisting essentially of methanethiol and hydrogen sulfide; cooling said second overhead fraction at a suitable elevated pressure with cooling water at a temperature of 60°–100° F. to produce a third liquid phase consisting essentially of methanethiol, and a third gaseous phase consisting essentially of hydrogen sulfide, admixing said liquid phase and said gas phase to produce a third, gas-liquid admixture, stabilizing and fractionating said admixture to produce a third, liquid, bottoms fraction consisting essentially of methanethiol, and third overhead product consisting essentially of hydrogen sulfide.

4. In a process in accordance with claim 3 the step of rectifying said third bottoms fraction to recovery substantially pure methanethiol.

5. In a process in accordance with claim 3 the steps of fractionally distilling said first, liquid, bottoms fraction consisting essentially of methanol and water recovering the methanol and recycling said methane to said reaction zone.

6. In a continuous process for the production of methanethiol wherein methanol and hydrogen sulfide are reacted at an elevated temperature in a reaction zone in the presence of a catalyst capable of splitting off water to produce a reaction effluent consisting essentially of water, methanol, 2-thiapropane, methanethiol, and hydrogen sulfide, the improvement which comprises fractionally condensing said effluent in a product recovery process maintained at a suitable superatmospheric pressure not in excess of about 600–1000 p. s. i. a. to obviate the need for mechanical refrigeration in said recovery process and permit the use of cooling water at a temperature of about 60°–100° F. for cooling and fractionally condensing the several constituents of the reaction effluent, said process comprising cooling said reaction effluent to a temperature of about 275° F. at a suitable elevated pressure with cooling water at a temperature of 60°–100° F., to produce a first liquid phase consisting essentially of water and methanol, and a first gaseous phase consisting essentially of 2-thiapropane, methanethiol and hydrogen sulfide, admixing said liquid phase and said gase phase to produce a first, gas-liquid admixture stabilizing and fractionating said admixture at a temperature of about 275° F. and a pressure of 80–90 p. s. i. a. to produce a first, liquid, bottoms fraction consisting essentially of water and methanol, and a first, gaseous, overhead fraction consisting essentially of 2-thiapropane, methanethiol, and hydrogen sulfide; cooling said first overhead fraction to a temperature of about 80° F. at a pressure of about 85–90 p. s. i. a. with cooling water at a temperature of about 60°–100° F. to produce a second liquid phase consisting essentially of 2-thiapropane and a second gaseous phase consisting essentially of methanethiol, and hydrogen sulfide, admixing said liquid phase and said gas phase to produce a second, gas-liquid admixture, stabilizing and fractionating said admixture at a temperature of about 215° F. and a pressure of about 85–90 p. s. i. a. to produce a second, liquid, bottoms fraction consisting essentially of 2-thiapropane and a second, gaseous overhead fraction consisting essentially of methanethiol and hydrogen sulfide; cooling said second overhead fraction to a temperature of 70° F. at a pressure of 85–90 p. s. i. a. to produce a third liquid phase consisting essentially of methanethiol, and a third gaseous phase consisting essentially of hydrogen sulfide, admixing said liquid phase and said gas phase to produce a third, gas-liquid admixture, stabilizing and fractionating said admixture at a temperature of 235° F. and a pressure of about 270–275 p. s. i. a. to produce a third, liquid, bottoms fraction consisting essentially of methanethiol, and third overhead product consisting essentially of hydrogen sulfide.

References Cited in the file of this patent

UNITED STATES PATENTS

| | | |
|---|---|---|
| 953,019 | Bergstrom | Mar. 29, 1910 |
| 2,009,554 | Lacomble | July 30, 1935 |
| 2,147,400 | Clark et al. | Feb. 14, 1939 |
| 2,667,515 | Beach et al. | Jan. 26, 1954 |